Patented May 13, 1930

1,758,425

UNITED STATES PATENT OFFICE

LOUIS BENDA, OF FRANKFORT-ON-THE-MAIN-FECHENHEIM, GERMANY, ASSIGNOR TO WINTHROP CHEMICAL COMPANY, INC., OF NEW YORK, N. Y., A CORPORATION OF NEW YORK

STABLE AND STERILIZED SOLUTION OF SALTS OF PARA-DIALKYLAMINOARYL-PHOSPHINOUS ACIDS

No Drawing. Application filed January 4, 1929, Serial No. 330,420, and in Germany March 29, 1928.

Solutions of salts of para-dialkylamino-arylphosphinous acids are not stable. This instability is particularly troublesome when attempting to sterilize such solutions. In many cases when shortly heated to temperatures necessary for sterilization they are decomposed while separating the corresponding arylamines, in other cases the sterilized solutions become colored when stored for a short time and separate a bluish violet precipitate.

Now I have found that by adding acid binding substances such as caustic alkalies or alkaline reacting soluble carbonates, phosphates or acetates to the solutions of salts of para-dialkylamino-arylphosphinous acids entirely stable and sterilizable solutions are obtained which are when applied in form of subcutaneous or intramuscular injections excellent entirely nonpoisonous and non-irritating roborants, stimulants for the metabolic process and antirhachitica.

My new process may be carried out by mixing the components in solid or dissolved form and then sterilizing the solution mixtures thereof. Generally small quantities of an acid binding substance are sufficient for obtaining entirely stable and sterilizable solutions.

As solvent pure water may be used. In some cases advantageously the so called physiological solutions may be applied such as the physiological common salt solution, the so called Ringer-solution and so on.

In order to further illustrate my invention the following examples are given, the parts being by weight and all temperatures in centigrade degrees, but it may be understood that my invention is not limited to the particular products or reacting conditions mentioned therein.

Example 1

1,25 kg. of the sodium salt of the 1-dimethylamino-3-methylbenzene-4-phosphinous acid (cf. Example 2 of U. S. Patent No. 1,607,113) are dissolved in about 100 kgs. of water. Then 40 grs. of sodium carbonate (natrium carbonicum siccum D. A. B. 6) are added and the solution is sterilized at 100° with a current of steam for about an hour.

The solution remains entirely clear and transparent, it is stable for an unlimited time, whereas a solution prepared in a like manner but without adding an acid binding substance decomposes when sterilized while separating oil drops consisting substantially of dimethyl-meta-toluidine.

Example 2

1,25 kg. of the sodium salt of the 1-dimethyl-amino-3-methylbenzene-4-phosphinous acid are dissolved in about 100 kgs. of water; then 45 grs. of sodium carbonate (natrium carbonicum siccum Deutsches Arzneibuch 6) and 0,8 kgs. of sodium chloride are added and the solution of the mixture is sterilized at 100° with a current of steam for about an hour. Also this solution remains entirely clear.

I claim:—

1. A process which comprises sterilizing solutions of mixtures of a salt of a para-dialkylamino-arylphosphinous acid and of an acid binding substance.

2. A process which comprises sterilizing solutions of mixtures of an alkali metal salt of a para-dialkylamino-arylphosphinous acid and of an acid binding substance.

3. A process which comprises adding the solution of an acid binding substance to a solution of a salt of a para-dialkylamino-arylphosphinous acid and sterilizing the solution mixture thus obtained.

4. A process which comprises adding an acid binding substance to a salt of a para-dialkylamino-arylphosphinous acid, dissolving the mixture and sterilizing the solution thus obtained.

5. As new compounds stable and sterilized solutions produced by sterilizing solutions of mixtures of a salt of a para-dialkylamino-arylphosphinous acid and of an acid binding agent.

6. As new compounds and sterilized solutions produced by sterilizing solutions of mixtures of an alkali metal salt of a para-dialkylamino-arylphosphinous acid and of an acid binding agent.

7. As new compounds stable and sterilized solutions produced by sterilizing solutions of mixtures of an alkali metal salt of the 1-dimethylamino-3-methylbenzene-4-phosphinous acid and of an acid binding agent.

8. As new compounds stable and sterilized solutions produced by sterilizing solutions of mixtures of an alkali metal salt of the 1-dimethylamino-3-methylbenzene-4-phosphinous acid and of sodium carbonate.

In testimony whereof, I affix my signature.

LOUIS BENDA.